Patented Jan. 20, 1953

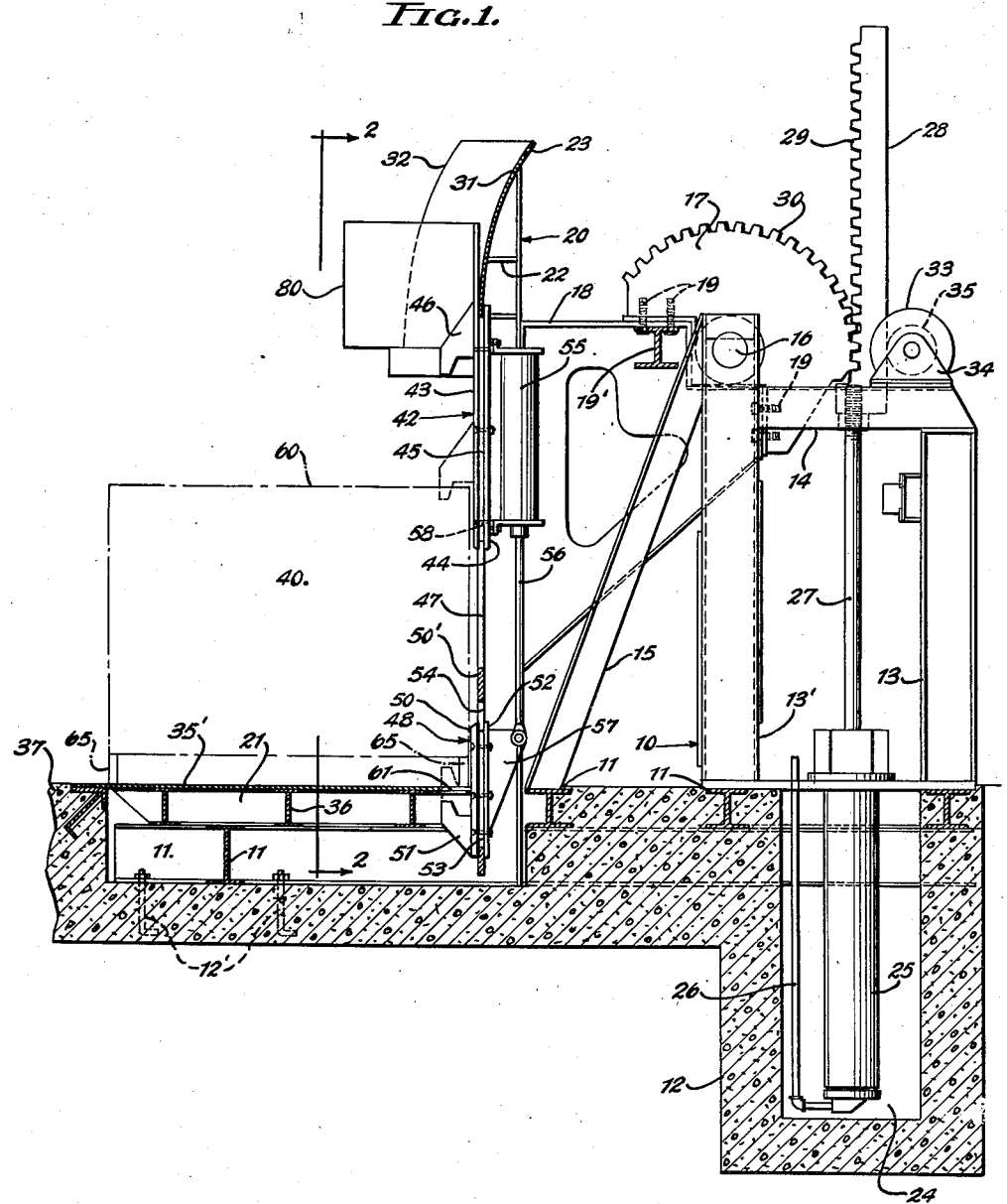

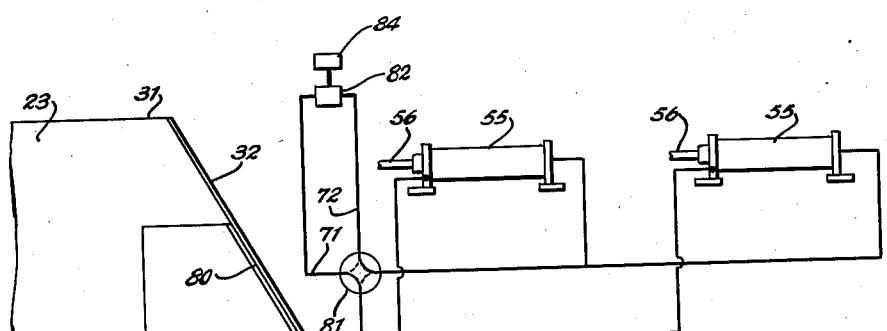
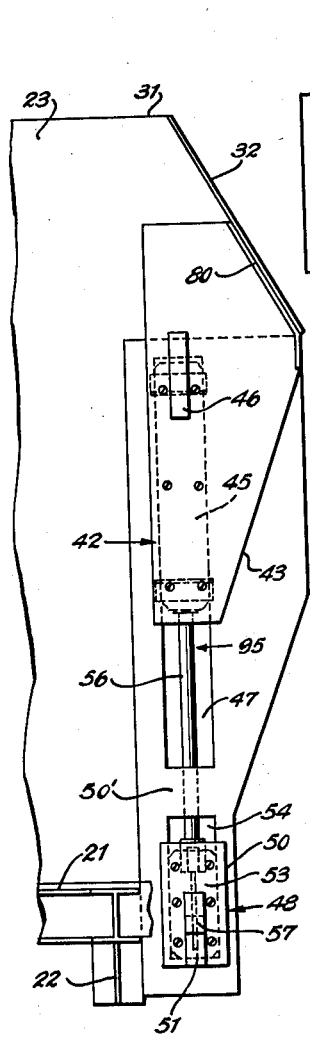
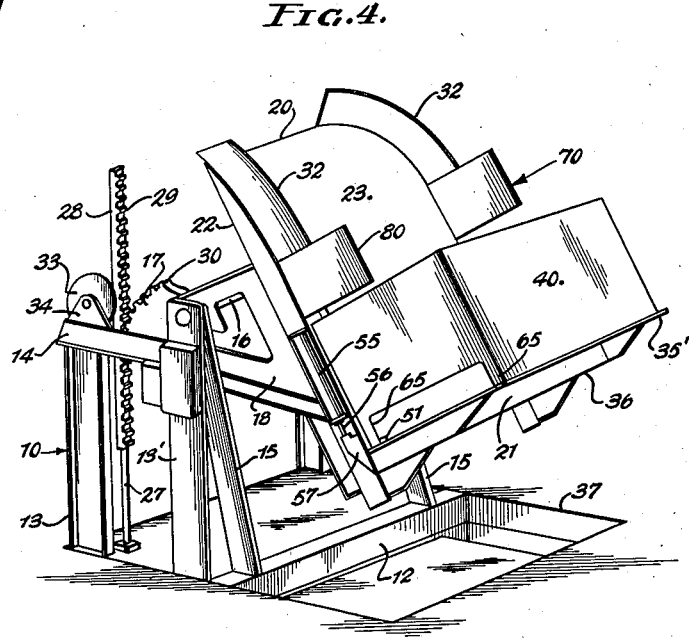

2,626,071

UNITED STATES PATENT OFFICE 2,626,071

RECEPTACLE DUMPING APPARATUS

Arthur Dean Smith, Spokane, Wash., assignor to Kaiser Aluminum & Chemical Corporation, Oakland, Calif., a corporation of Delaware Application January 31, 1950, Serial No. 141,367

6 Claims. (Cl. 214—314)

This invention relates to receptacle handling apparatus, and more particularly to a loading station adapted to elevate and tilt a receptacle containing scrap metal or the like so that the contents of the receptacle can be discharged therefrom.

The apparatus or loading station embodied in this invention is particularly designed for unloading scrap metal or the like from scrap metal containers, into the hopper or skip of a furnace charging machine traveling along a track located adjacent a plurality of melting furnaces, and which supplies the charge to the several furnaces after it has initially picked up the charge from the loading station.

One of the objects of this invention is to provide a novel loading station for a furnace charging machine or the like which is simple in construction and in operation.

Another object of the invention is to provide a loading station having a receiving platform adapted to be substantially flush with the floor in its loading position and to pass upward in an arcuate path for discharge of the contents thereof and to thereafter return to its initial position upon completion of the loading and unloading cycle.

A still further object of the invention is to provide a loading station apparatus in which the principal actuating mechanism is recessed in a fixed position beneath the floor to provide a maximum of free area of travel for the load carrying section thereof.

Another object of the invention is to provide novel means for securing the receptacle or container containing scrap metal or the like on the loading station against displacement, when the loading station has been tilted to a discharging position.

A further object of the invention is to provide a novel arrangement for securing a receptacle, containing goods to be discharged, on the loading station against displacement and in adjustable relation with the container.

A still further object of the invention is to provide novel power means for actuating the clamping jaws comprising the aforesaid securing means.

Another object of the invention is to provide a novel loading station of compact form which occupies only a minimum amount of space.

These and other objects are attained by providing an apparatus for discharging and dumping the contents of receptacles containing scrap metal or the like comprising a receptacle receiving means, which receiving means includes a platform and a backboard, web means extending from the backboard, a gear segment attached to the extremity of the web means spaced from the backboard, rack means extending from a vertically disposed shaft and engaging the gear segment, hydraulic means for actuating the rack means, a fixed frame comprising a plurality of upright members and a cross member upon which the gear segment is journalled for pivotal movement so that upon reciprocation of the rack means the gear segment is actuated to move the receptacle receiving means in an arcuate path about the fixed frame to thereby discharge the contents of the receptacle and thereafter return the receptacle receiving means to its initial position. In addition, the apparatus may include a plurality of clamping jaws mounted on and slidable along the backboard to lockingly engage opposing edge portions of the receptacle placed upon the receptacle receiving means to thereby hold the receptacle thereon when the receptacle receiving means is tilted to a discharging position.

Further objects and advantages of the instant invention reside in the novel combination and arrangement of parts about to be described, when taken in conjunction with the accompanying drawings, wherein:

Figure 1 is a side elevational view of the loading station, with the floor, base, and platform and backboard sections of the receptacle receiving means being shown in section, and with a receptacle and the clamping jaws mounted on the backboard being shown in dotted lines.

Figure 2 is a detail view in front elevation of a broken away portion of the backboard taken generally along lines 2—2 of Figure 1 and showing the arrangement of the adjustable clamping jaw mechanism and the backboard with respect to each other.

Figure 3 is a schematic diagram of the piping arrangement used with the air cylinders which actuate the clamping jaws for holding the receptacle in place upon the loading station.

Figure 4 is a perspective view of the loading station with the platform, backboard and the container mounted thereon shown in a partially elevated position.

With further reference to the drawings and particularly Fig. 1, the loading station is generally comprised of a supporting framework 10, mounted on a plurality of structural members 11 embedded in the masonry 12. These structural members may be affixed to the masonry by means of bolts 12'. The supporting framework may be of any suitable construction and comprises a pair each of upright or vertical beams 13 and 13', connected by cross members 14 and diagonal or bracing beams 15 each of which is connected at its uppermost end to the vertical beams 13'.

Journalled at the upper extremities of each vertical beam 13' are the ends of horizontal cross member or shaft 16. Also journalled on shaft 16 are a pair of gear segments 17, each such segment is spaced adjacent to a shaft 13' and a slight distance inwardly therefrom.

Each gear segment 17 is rigidly secured to a web member 18 and to a cross member 19' which may be employed to join the webs together by means of the bolts 19. Web members 18 are also secured to a receptacle receiving means 70 comprised of a backboard 20, which has a receiving platform 21 affixed to its lower extremity. The web members are affixed directly to the backboard by any suitable means, and in the present instance they are welded integrally therewith. Although backboard 20 may consist of a solid member, it is preferably comprised of a suitable framework 22 with metal sheathing 23 covering the side thereof facing the receptacle placed on the platform 21.

Located under each side of the supporting framework 10 in the masonry 12 is a separate well 24, having a hydraulic cylinder 25 mounted therein. A conduit 26 is connected to each cylinder 25 and supplies fluid to the cylinder from a suitable source for reciprocation of the piston rod or shaft 27 operated by each cylinder 25. Affixed to the ends of each of the piston rods 27 is rack 28. Teeth 29 on each of the racks 28 engage the teeth 30 of the gear segments 17. Upon actuation of the piston rods 27 reciprocating in cylinders 25, racks 28 will be caused to move and in turn will impart movement to the gear segments 17.

Since gear segments 17 are rigidly connected to backboard 20 by means of the webs 18, movement of the gear segments will impart movement to backboard 20 and platform 21. As disclosed in Fig. 1, downward movement of the racks 28 will cause rotational movement of gear segments 17 about shaft 16 to thereby raise loading platform 21 and backboard 20, i. e., receptacle receiving means 70, through an upward arcuate path to a discharging position. (Note Fig. 4.) Upward movement of the racks will cause rotation of gear segments 17 in an opposite direction and will lower loading platform 21 and backboard 20, through the arcuate path originally traversed, into the initial receiving or retracted position.

The discharge end 31 of the backboard may advantageously be provided with sheet metal sides 32 so that a chute or trough arrangement will be formed at the top or discharge end of the backboard.

A pair of guide-wheels 33, one for each rack 28, may also be mounted for rotation in the bearing members 34 generally affixed to framework 10. Wheels 33 have inner rims 35 which will contact the racks 28 and serve to guide, support and reinforce the racks during their reciprocatory movement.

Platform 21 comprised of the receiving metal plate or surface 35' mounted on platform framework 36 is also advantageously affixed to the framework 22 of backboard 20 in such a way that in its lowermost or receiving position it will be retracted within and flush with the floor 37, so that a tote box or receptacle 40 containing scrap metal or the like can be easily placed on the metal plate 35'.

A receptacle 40 of the type generally found useful with the device of the present invention is shown in dotted lines as mounted on plate 35' of platform 20. The means for retaining a receptacle 40 upon the platform 21 consists of two adjustable clamping assemblies indicated generally at 95 arranged at opposite ends of the backboard, one assembly being shown in detail in Figure 2. Each assembly is similarly constructed and functions in the same manner.

The construction of a clamping assembly of the type disclosed in Figures 1 and 2 will now be described. As will be noted the assembly 95 includes upper section 42 and lower section 48 which are adapted for reciprocation to engage the receptacle 40 or the like.

The upper section 42 is comprised of the inner plate member 43, outer plate member 44, and a middle plate member 45, sandwiched between plate members 44 and 43. A hook shaped member or clamp 46 is rigidly fastened to the inner plate member 43. The middle plate 45 is adapted to reciprocate in upper longitudinal slot 47 on the backboard. Plates 43, 44 and 45 are bolted together as indicated at 58. Plates 43 and 44 are considerably wider than plate 45 and the slot 47, and thus retain middle plate 45 within the slot 47.

Lower clamp section 48 is constructed in a manner similar to upper clamp section 42, and is comprised of inner plate 50 to which the hook shaped member or clamp 51 is rigidly secured, outer plate 52, and middle plate 53. Plate 53 is adapted to reciprocate in the lower longitudinal slot 54 in the same manner as plate 45 reciprocates in slot 47.

As shown here slot 54 is shorter in length than slot 47. Plates 52 and 50, due to their greater width serve to retain middle plate 53 within slot 54. Longitudinal slots 47 and 54 are arranged in the heavy metal sheathing 23 which is fastened to the framework 22 on the backboard 20 in the same vertical plane and are separated from each other by the web portion 50' of the heavy metal sheathing 23.

Secured to the outer plate 44 of the upper clamp section 42 is an air cylinder 55 within which a piston rod 56 reciprocates. At its opposite end piston rod 56 is pivotally attached to a bracket 57, which in turn is rigidly secured to the outer plate 52 of the lower clamp section 48.

Inner plate 43 of the upper clamp section 42 is so constructed as to have an upstanding flange 80 which telescopes with the sides 32 of backboard sheathing 23 as the inner plate 43 reciprocates with the clamp section 42.

After a receptacle containing scrap metal or the like has been placed on platform 21 by a lift truck or the like the upper clamp assembly 42 is given a downward movement by the proper action of the air cylinder 55, e. g., by decreasing the air pressure in the top part of the cylinder, so the upper clamp assembly will move downward under the force of gravity until the clamp 46 is stopped when it engages the top rim 60 of the container or tote box 40.

At this juncture piston rod 56 is pulled upward by the proper action of the air cylinder, e. g., by increasing the air pressure in the bottom part of the air cylinder. Upward movement of piston rod 56 causes the lower clamp section 48 to move upward, holes 61 being provided in the receiving surface 35' of platform 21, to allow upward movement of the lower clamps 51 through the platform. The lower clamp assembly will move upwardly until lower clamp 51 engages the lower rim or runner 65 of the tote box 40 at which time the tote box will be locked on platform 21 by means of clamps or jaws 51 and 46. When the tote box 40 has been locked on the loading station the platform and backboard can be rotated in the manner heretofore described to a discharging position so that the contents of the tote boxes can be discharged therefrom into the skip or hopper of the furnace charging machine. After the dumping operation the platform, backboard and tote box are returned to their normal position. The lower clamp section 48 is lowered and the upper clamp section 42 is raised by adjusting the pressure within cylinder 55. The empty tote box upon being released, can then be moved off the platform 21, and the loading station is then ready for another cycle of operation.

Figure 3 discloses a typical piping arrangement that can be used in operating air cylinders 55 from a common power source.

The piping arrangement essentially comprises motor 84 and compressor and tank 82, air intake conduit 71, cylinders 55 in which are located the pistons for actuating rods 56, exhaust conduit 72, and a four way valve 81. By proper manipulation of valve 81 the pressure within cylinders 55 may be simultaneously affected to exactly the same extent and thereby carry out the heretofore described movement of upper and lower clamp sections of each clamp assembly.

Although the instant invention is particularly adapted for unloading scrap metal or the like from a container or receptacle into the skip of a furnace charging machine, it is to be understood that it can be used for unloading other receptacles of their contents, such as receptacles containing fruits, vegetables, or other bulk articles. Also, where the nature of the material is such that the goods to be handled can be satisfactorily stacked or piled on the platform and no receptacle is required, the invention is equally useful.

Accordingly, it will be apparent to those skilled in the art that various modifications may be made in the instant invention without departing from the spirit or scope thereof and, accordingly, the invention is not to be taken as limited except by the appended claims wherein what is claimed is:

1. Apparatus for dumping the contents of receptacles containing scrap metal and the like comprising a receptacle receiving means, said receiving means including a platform and a backboard, web means extending from said backboard, a gear segment attached to the extremity of said web means spaced from said backboard, rack means extending from a vertically disposed shaft and engaging said gear segment, hydraulic means for actuating said rack means, a fixed frame comprising a plurality of upright members and a cross-member upon which said gear segment is journalled for pivotal movement so that upon reciprocation of said rack means the gear segment is actuated to move said receptacle receiving means in an arcuate path about said fixed frame to thereby discharge the contents of the receptacle and thereafter return said receptacle receiving means to its initial position, and a pair of adjustable, receptacle engaging clamps spaced longitudinally from each other on the said backboard and slidable along the inner surface of the said backboard, one of said clamps being adapted to engage the upper portion of said receptacle and the other of said clamps being adapted to engage the lower part of said receptacle.

2. Apparatus for dumping the contents of receptacles containing scrap metal and the like comprising a receptacle receiving means, said receiving means including a platform and a backboard, a plurality of webs extending from said backboard, gear segments attached to the ends of said webs spaced from said backboard, rack means extending from vertically disposed shafts and engaging said gear segments, hydraulic means for actuating said rack means, a fixed frame including a plurality of upright members and a cross arm upon which said gear segments are journalled for pivotal movement so that upon reciprocation of said rack means the gear segments are actuated to move said receptacle receiving means in an arcuate path about said fixed frame to a discharging position and to return said receptacle receiving means to its initial position and means for retaining the receptacle upon said receptacle receiving means when said receiving means is moved to said discharging position, said receptacle retaining means including a pair of adjustable, receptacle engaging clamps spaced longitudinally from each other on the said backboard and slidable along the inner surface of the said backboard, one of said clamps being adapted to engage the upper portion of said receptacle and the other of said clamps being adapted to engage the lower part of said receptacle and common power means for actuating both of said receptacle engaging clamps.

3. Apparatus for dumping the contents of receptacles containing scrap metal or the like comprising a receptacle receiving means, said means including a platform and a backboard, side guide members on said backboard, a plurality of webs extending from said backboard, gear segments attached to the ends of said webs spaced from said backboard, rack means extending from vertically disposed shafts and engaging said gear segments, hydraulic means for actuating said rack means, a fixed frame including a plurality of upright members and a cross arm upon which said gear segments are journalled for pivotal movement so that upon reciprocation of said rack means the gear segments are actuated to move said receptacle receiving means in an arcuate path about said fixed frame to thereby tilt said receptacle receiving means, a clamping jaw mounted on and slidable along the inner surface of said backboard to lockingly engage the upper edge portion of the receptacle placed upon said receptacle receiving means to thereby hold the receptacle upon said receiving means when said receiving means is tilted to a discharging position, and a guide member affixed to said jaw and adapted to cooperate with a side guide member on the said backboard when said jaw is reciprocated to engage the receptacle placed on the said platform.

4. Apparatus for dumping the contents of receptacles containing scrap metal or the like comprising a receptacle receiving means, said means including a platform and a backboard, web means extending from said backboard, a gear segment affixed to one of the extremities of said web means spaced from said backboard, rack means extending from a vertically disposed shaft and engaging said gear segment, hydraulic means for actuating said rack means, a fixed frame upon which said gear segment is journalled for pivotal movement so that upon reciprocation of said rack means, the gear segment is actuated to move said receptacle receiving means in an arcuate path about said fixed frame to thereby tilt said receptacle receiving means and a pair of adjustable clamping jaws for each inner side of the backboard, the jaws in each pair being longitudinally spaced from one another on the backboard, one of the jaws in each pair being adapted to engage the upper portion of the said receptacle and the other jaw of each pair being adapted to engage the lower part of said receptacle and common power means for actuating all of said receptacle engaging jaws.

5. Apparatus for dumping the contents of receptacles containing scrap metal and the like comprising a receptacle receiving means, said receiving means including a platform and a backboard provided with a plurality of spaced, longitudinal slots, individual clamping jaws adapted to reciprocate in each of said slots for engaging opposing end portions of a receptacle mounted on said receptacle receiving means to thereby hold the receptacle in place on the platform when said platform and backboard are tilted, means for tilting said platform and backboard including a plurality of webs extending from said backboard, gear segments affixed to the ends of said webs spaced from said backboard, rack means for engaging said gear segments, hydraulic means for actuating said rack means and a fixed frame upon which said gear segments are journalled for pivotal movement, and common power means for reciprocating said clamping jaws in said slots so as to enable them to clampingly engage receptacles of different sizes that are placed on the said platform.

6. Apparatus for dumping the contents of receptacles containing scrap metal or the like comprising a receptacle receiving means, said receiving means including a platform and a backboard, side guide members on said backboard, a plurality of webs extending from said backboard, gear segments affixed to the ends of said webs spaced from said backboard, rack means extending from vertically disposed shafts and engaging said gear segments, hydraulic means for actuating said rack means, a fixed frame including a plurality of upright members and a cross arm upon which said gear segments are journalled for pivotal movement so that upon reciprocation of said rack means the gear segments are actuated to move said receptacle receiving means in an arcuate path about said fixed frame to thereby discharge the contents of the receptacle and return said receptacle receiving means to its initial position, means for retaining a receptacle upon said receptacle receiving means when said receiving means is moved to said discharging position, including an upper and lower spaced and adjustable clamping jaw on each side of the said backboard for engaging the upper and lower portions of a receptacle, a guide member affixed to each upper clamping jaw and adapted to cooperate with a side guide member on the said backboard when said upper jaw is actuated, and common power means for actuating all of said clamping jaws.

A. DEAN SMITH.

REFERENCES CITED

The following references are of record in the file of this patent:

UNITED STATES PATENTS

| Number | Name | Date |
|---|---|---|
| 1,677,290 | Parker | July 17, 1928 |
| 1,973,767 | Kimball et al. | Sept. 18, 1934 |
| 2,332,526 | Pehel | Oct. 26, 1943 |
| 2,344,664 | Adams | Mar. 21, 1944 |